US012428884B1

(12) United States Patent
Spinel

(10) Patent No.: US 12,428,884 B1
(45) Date of Patent: Sep. 30, 2025

(54) ELEVATOR DOOR LOCKOUT WITH EXTENDABLE HANDLE

(71) Applicant: Gian Spinel, East Meadow, NY (US)

(72) Inventor: Gian Spinel, East Meadow, NY (US)

( * ) Notice: Subject to any disclaimer, the term of this patent is extended or adjusted under 35 U.S.C. 154(b) by 237 days.

(21) Appl. No.: 18/203,115

(22) Filed: May 30, 2023

(51) Int. Cl.
*E05C 17/54* (2006.01)

(52) U.S. Cl.
CPC .................................... *E05C 17/54* (2013.01)

(58) Field of Classification Search
CPC ....................................................... E05C 17/54
See application file for complete search history.

(56) References Cited

U.S. PATENT DOCUMENTS

| | | | | |
|---|---|---|---|---|
| 1,681,834 | A | 8/1928 | Arends | |
| 2,444,981 | A | 7/1948 | Dailey | |
| 4,483,558 | A * | 11/1984 | Van Meter | E05C 19/004 292/339 |
| 4,805,948 | A * | 2/1989 | Renzi | E05C 17/54 292/342 |
| 5,217,269 | A | 6/1993 | Wiltberger | |
| 5,340,175 | A * | 8/1994 | Wood | E05C 19/004 292/339 |
| 6,557,915 | B1 * | 5/2003 | Duff | E05C 17/54 292/343 |
| 7,938,461 | B2 | 5/2011 | Ollinger | |
| 7,976,080 | B1 * | 7/2011 | Duff | E05C 17/54 292/343 |
| 9,334,682 | B2 * | 5/2016 | Kaplafka, Jr. | E05C 19/004 |
| 9,605,456 | B2 * | 3/2017 | Booker | E05C 17/44 |
| D837,644 | S * | 1/2019 | Schleimer | D8/402 |
| 10,793,396 | B1 * | 10/2020 | Macareno | B66B 13/16 |
| 11,649,657 | B2 * | 5/2023 | Sak | H02G 1/02 70/14 |
| 2014/0319437 | A1 * | 10/2014 | Plummer | E05C 17/54 254/105 |
| 2023/0108739 | A1 * | 4/2023 | Major | E05F 5/08 16/85 |
| 2023/0203858 | A1 * | 6/2023 | Audirac | E05B 1/0046 292/145 |

FOREIGN PATENT DOCUMENTS

| | | |
|---|---|---|
| GB | 2279108 | 12/1994 |

* cited by examiner

*Primary Examiner* — Mark A Williams
(74) *Attorney, Agent, or Firm* — Kyle A. Fletcher, Esq.

(57) ABSTRACT

The elevator door lockout with extendable handle includes an elevator door lockout and an extendable handle. The elevator door lockout with extendable handle may be operable to prevent movement of a hoistway door of an elevator by wedging the elevator door lockout between a sill groove and the hoistway door. The elevator door lockout may be engaged by turning a threaded shaft of the extendable handle in a first rotational direction. The elevator door lockout may be disengaged by turning the threaded shaft in a second rotational direction. The extendable handle may be adapted to turn the threaded shaft by grasping and turning the top of the extendable handle without requiring a user to bend down.

17 Claims, 6 Drawing Sheets

ELEVATOR DOOR LOCKOUT WITH EXTENDABLE HANDLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of elevator maintenance tools, more specifically, an elevator door lockout with extendable handle.

Summary of Invention

The elevator door lockout with extendable handle comprises an elevator door lockout and an extendable handle. The elevator door lockout with extendable handle may be operable to prevent movement of a hoistway door of an elevator by wedging the elevator door lockout between a sill groove and the hoistway door. The elevator door lockout may be engaged by turning a threaded shaft of the extendable handle in a first rotational direction. The elevator door lockout may be disengaged by turning the threaded shaft in a second rotational direction. The extendable handle may be adapted to turn the threaded shaft by grasping and turning the top of the extendable handle without requiring a user to bend down.

An object of the invention is to temporarily immobilize a hoistway door of an elevator during maintenance activities.

Another object of the invention is to provide an elevator door lockout that may wedge between a sill groove and the bottom of the hoistway door to prevent movement of the hoistway door.

A further object of the invention is to provide an extendable handle that couples to the elevator door lockout and allows the elevator door lockout to be engaged by a standing user.

Yet another object of the invention is to provide a pivoting grip on the extendable handle that acts as a lever for rotating the extendable handle.

These together with additional objects, features and advantages of the elevator door lockout with extendable handle will be readily apparent to those of ordinary skill in the art upon reading the following detailed description of the presently preferred, but nonetheless illustrative, embodiments when taken in conjunction with the accompanying drawings.

In this respect, before explaining the current embodiments of the elevator door lockout with extendable handle in detail, it is to be understood that the elevator door lockout with extendable handle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the elevator door lockout with extendable handle.

It is therefore important that the claims be regarded as including such equivalent construction insofar as they do not depart from the spirit and scope of the elevator door lockout with extendable handle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
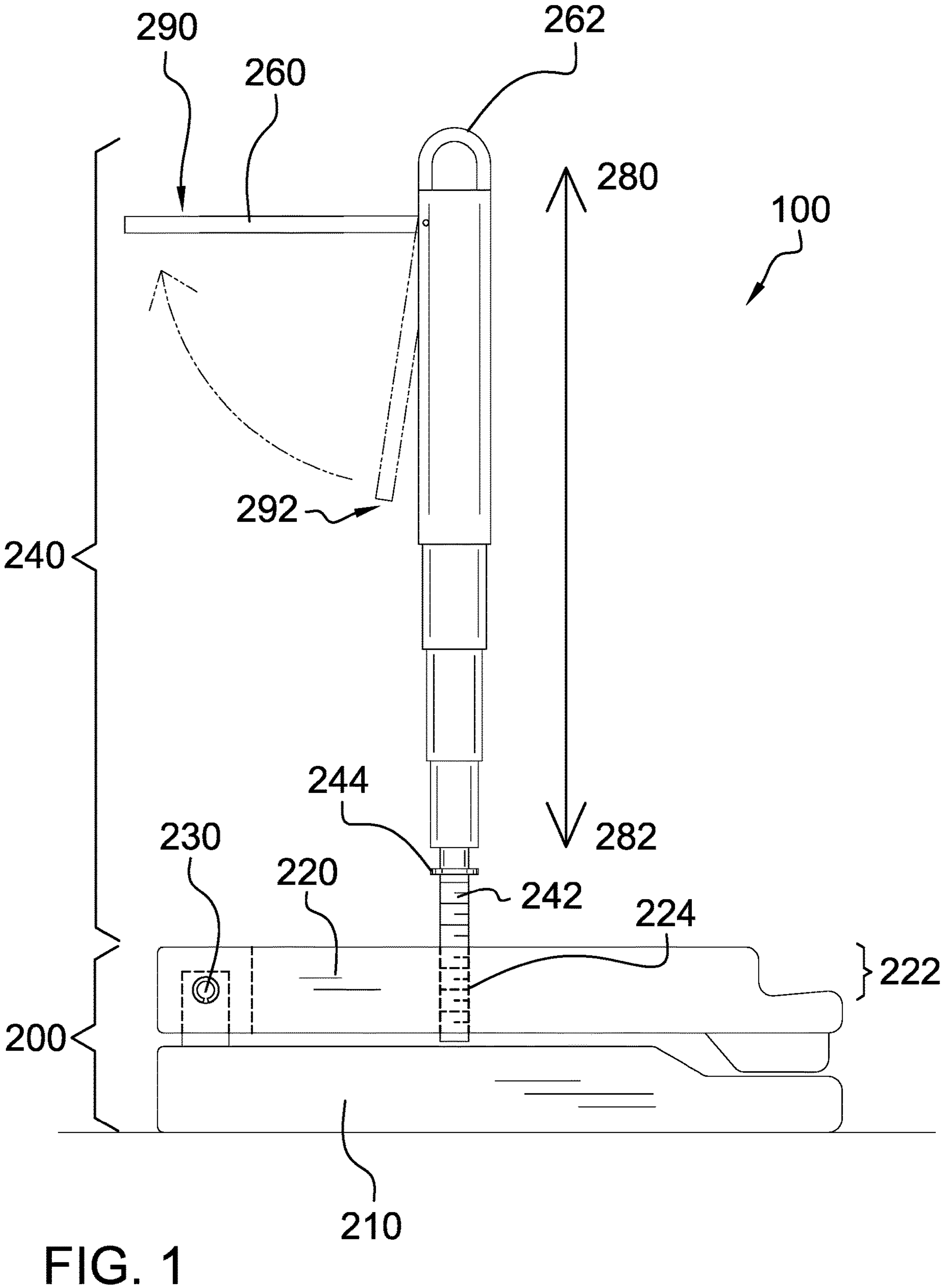
FIG. 1 is a front view of an embodiment of the disclosure.
Figure 2:
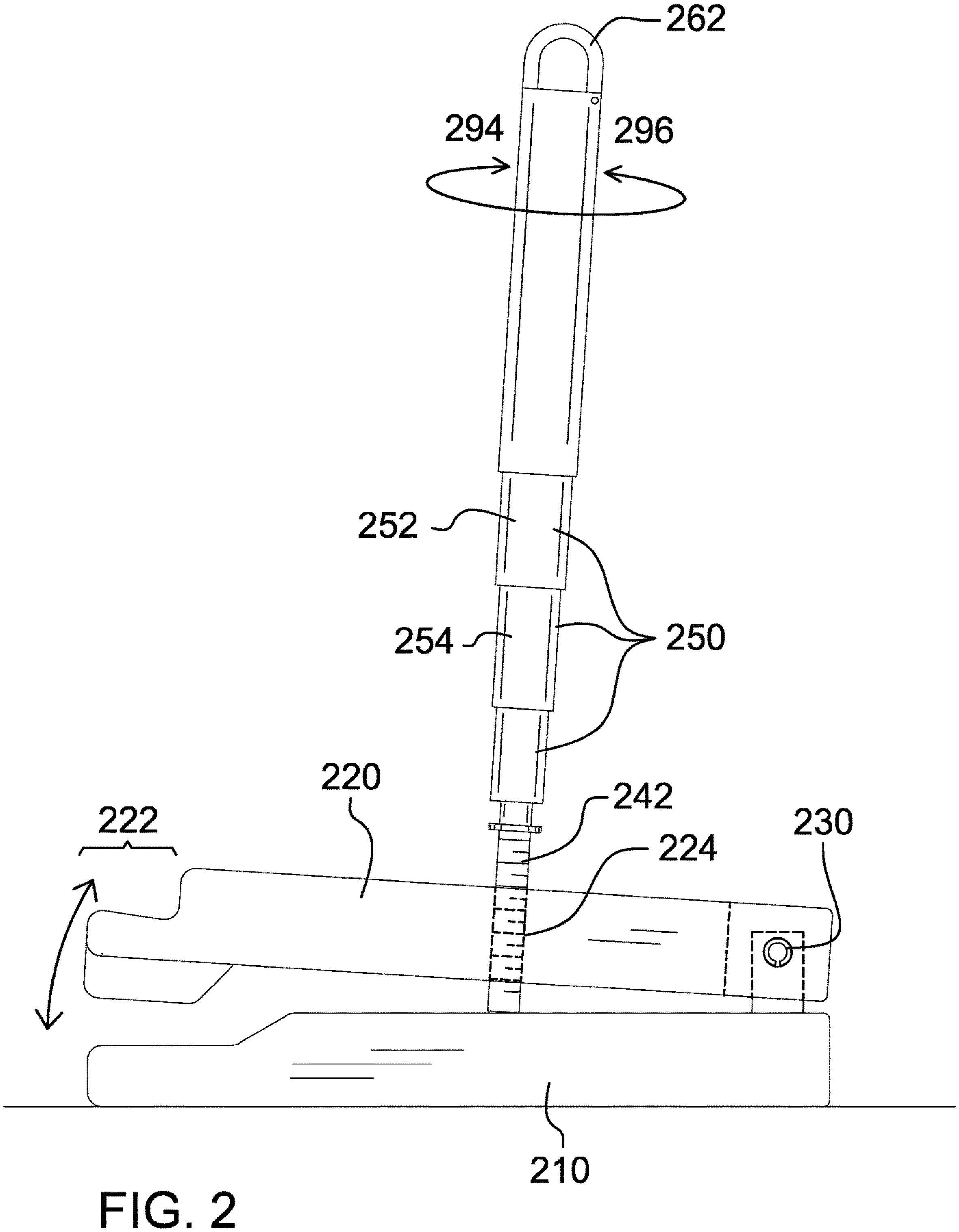
FIG. 2 is a rear view of an embodiment of the disclosure.
Figure 3:
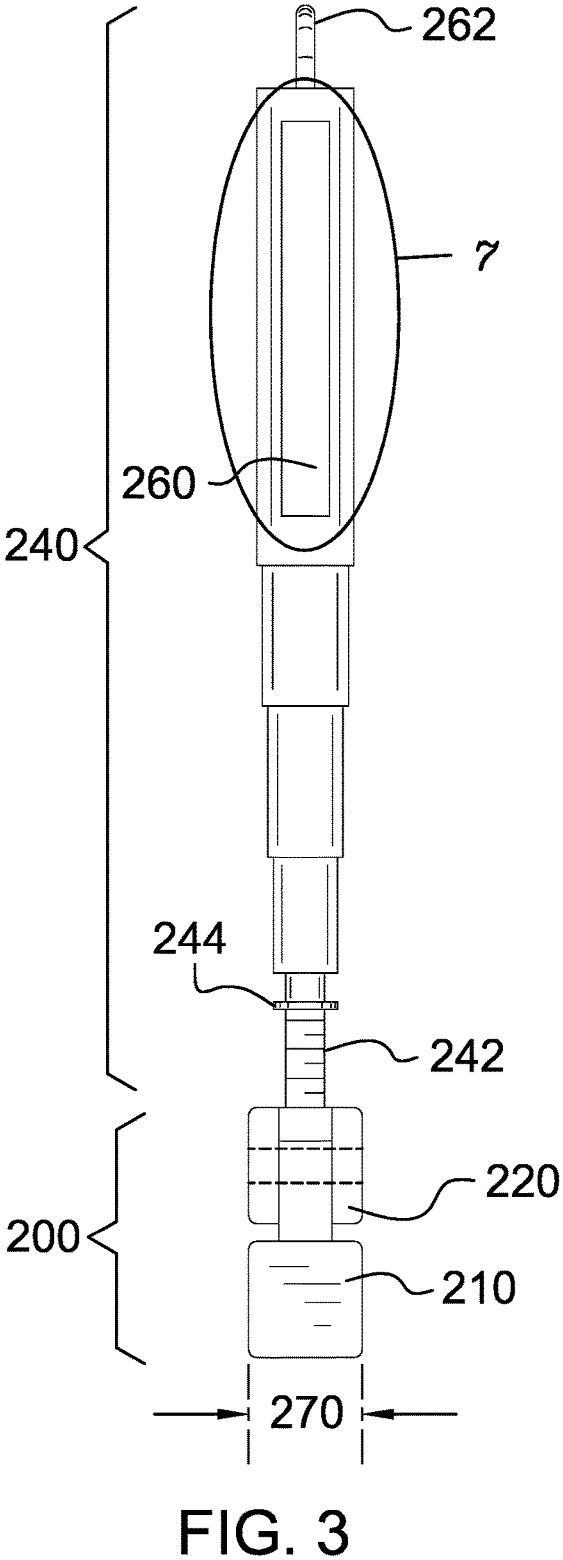
FIG. 3 is a left side view of an embodiment of the disclosure.
Figure 4:
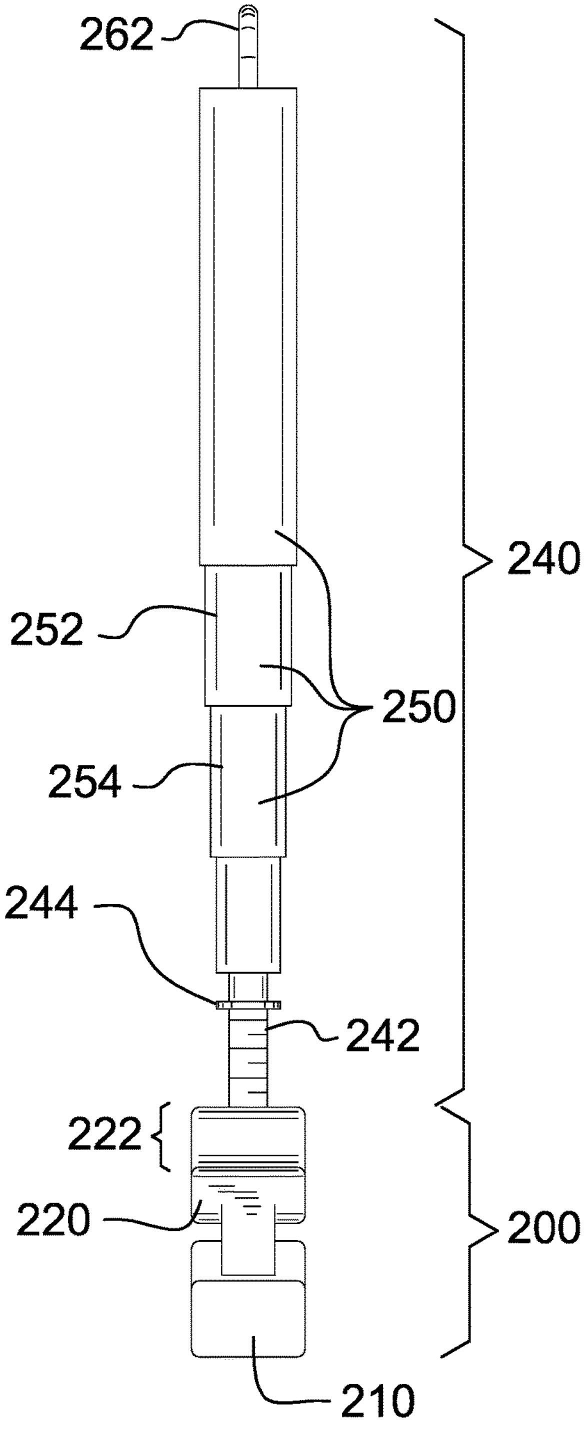
FIG. 4 is a right side view of an embodiment of the disclosure.
Figure 5:
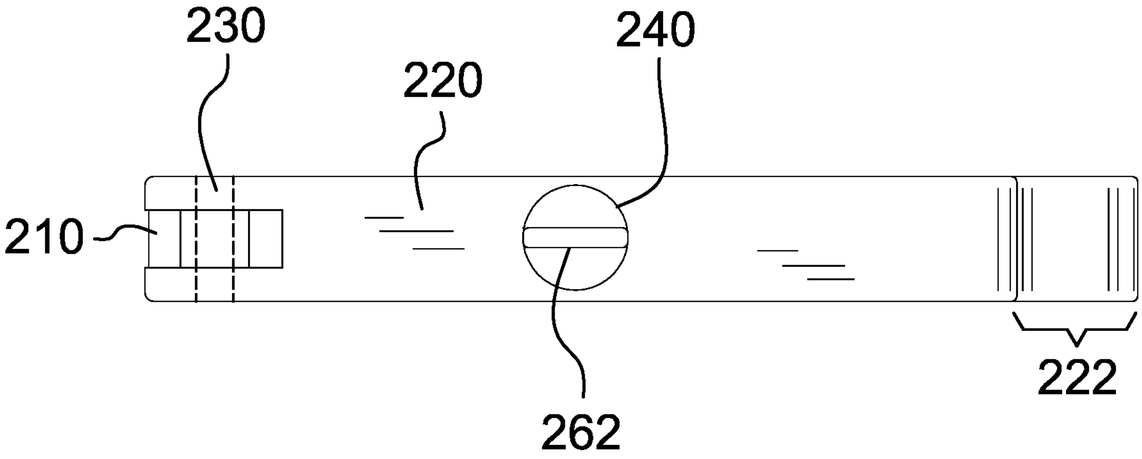
FIG. 5 is a top view of an embodiment of the disclosure.
Figure 6:
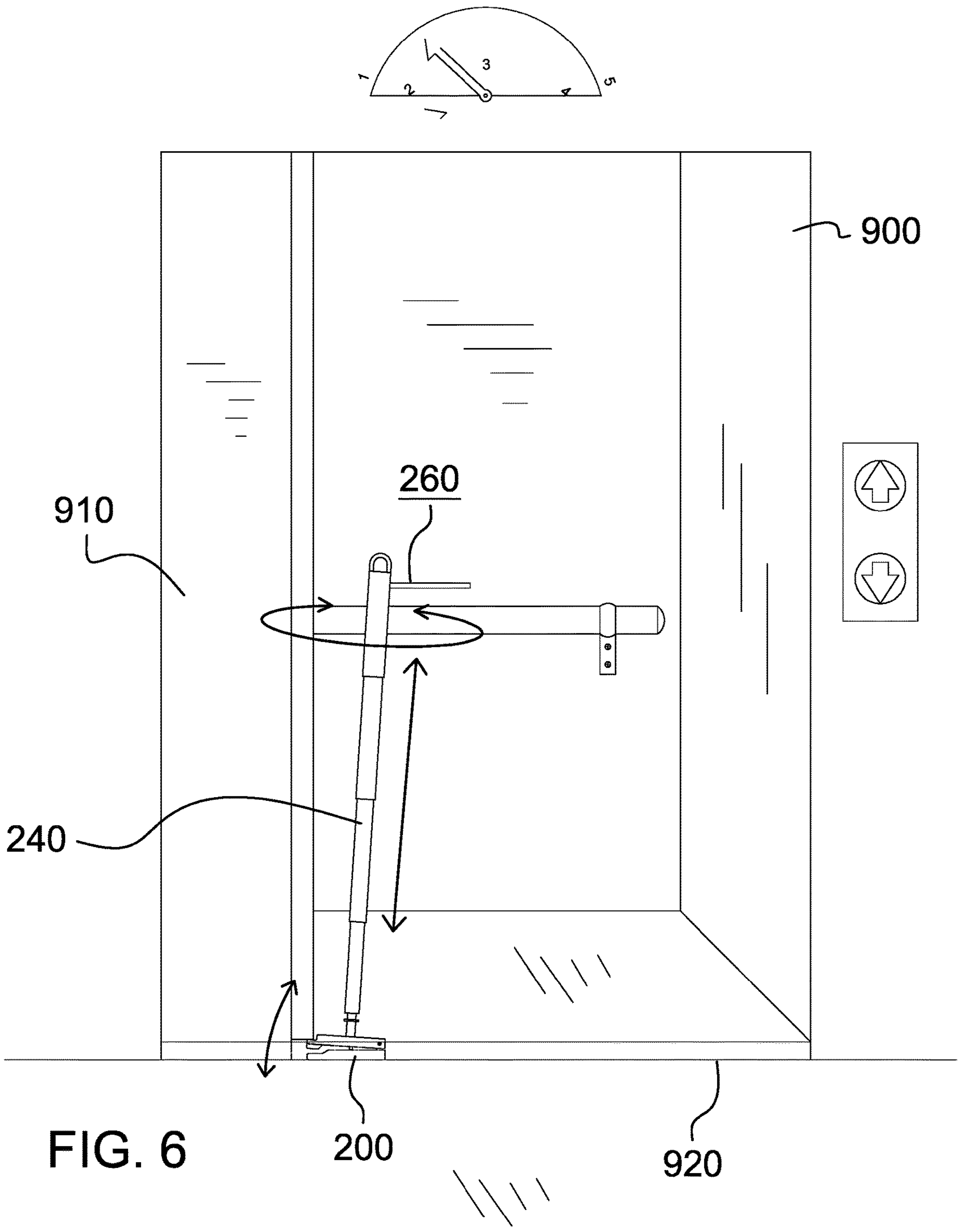
FIG. 6 is an in-use view of an embodiment of the disclosure.
Figure 7:
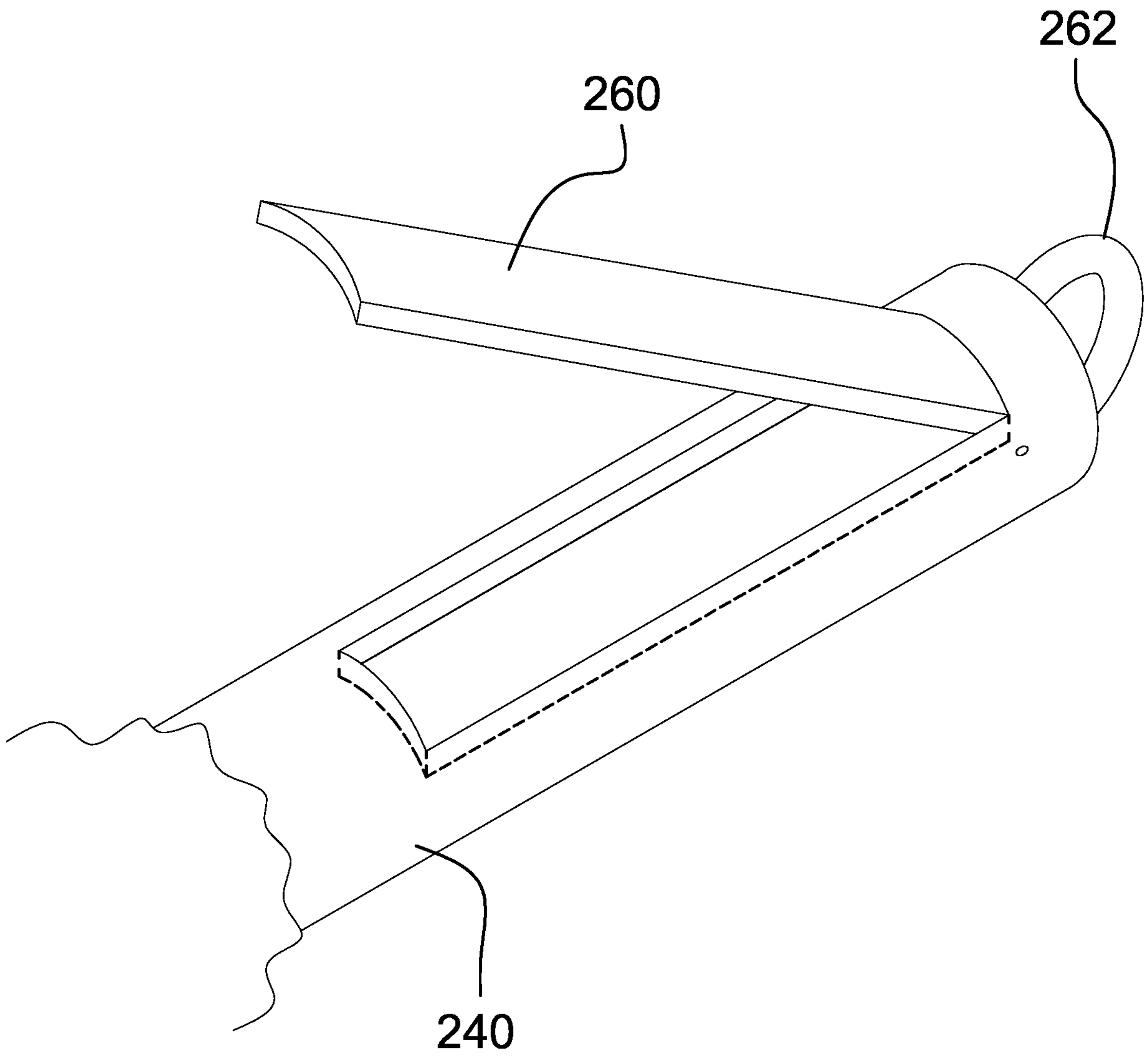
FIG. 7 is a detail view of an embodiment of the disclosure showing the area designated t in FIG. 3.

Detailed reference will now be made to a first potential embodiment of the disclosure, which is illustrated in FIGS. 1 through 7.

The elevator door lockout with extendable handle 100 (hereinafter invention) comprises an elevator door lockout 200 and an extendable handle 240. The invention 100 may be operable to prevent movement of a hoistway door 910 of an elevator 900 by wedging the elevator door lockout 200 between a sill groove 920 and the hoistway door 910. The elevator door lockout 200 may be engaged by turning a threaded shaft 242 of the extendable handle 240 in a first rotational direction 294. The elevator door lockout 200 may be disengaged by turning the threaded shaft 242 in a second rotational direction 296. The extendable handle 240 may be adapted to turn the threaded shaft 242 by grasping and turning the top of the extendable handle 240 without requiring a user to bend down.

The elevator door lockout 200 may comprise a base bar 210 and a pivot bar 220. The base bar 210 may be configured to fit into the sill groove 920 of the elevator 900. The base bar width 270 as measured from front to rear may be less than the width of the sill groove 920 as measured from front to rear.

The pivot bar 220 may be located above the base bar 210. The base bar 210 and the pivot bar 220 may be pivotably coupled via a hinge pin 230. The pivot bar 220 may comprise a door lift shoulder 222. The door lift shoulder 222 may be a downward-oriented notch located at the end of the pivot bar 220 that is opposite the hinge pin 230. The elevator door lockout 200 may be positioned such that the door lift shoulder 222 is located beneath the hoistway door 910. The pivot bar 220 may pivot at the hinge pin 230 in order to press the door lift shoulder 222 up against the bottom of the hoistway door 910.

The pivot bar 220 may comprise a handle aperture 224. The handle aperture 224 may be a vertically-oriented threaded aperture located at a midpoint of the pivot bar 220. The threaded shaft 242 may pass through the handle aperture 224. The threaded shaft 242 may comprise a thread that is complementary to the threading of the handle aperture 224 such that the threaded shaft 242 may screw into the handle aperture 224.

The extendable handle 240 may comprise a plurality of telescoping sections 250, the threaded shaft 242, and a pivoting hand grip 260. The extendable handle 240 may be adapted for the user to rotate from a standing position in order to engage and disengage the elevator door lockout 200 by pivoting the pivot bar 220.

The plurality of telescoping sections 250 may be operable to lengthen and shorten the extendable handle 240 to change the height of the pivoting hand grip 260. Two adjacent sections of the plurality of telescoping sections 250 may be different diameters such that a lower section 254 may slide into and out of an upper section 252. The extendable handle 240 may be lengthened to a handle extended configuration 280 by sliding the lower section 254 out of the upper section 252. The extendable handle 240 may be shortened to a handle retracted configuration 282 by sliding the lower section 254 into the upper section 252.

The threaded shaft 242 may be coupled to the bottom of the extendable handle 240. The threaded shaft 242 may be turned in the first rotational direction 294 to screw the threaded shaft 242 into the pivot bar 220 and to press the bottom of the threaded shaft 242 against the base bar 210. Pressing the bottom of the threaded shaft 242 against the base bar 210 may push the pivot bar 220 away from the base bar 210 thus pivoting the door lift shoulder 222 upwards. The threaded shaft 242 may be turned in the second rotational direction 296 to unscrew the threaded shaft 242 from the pivot bar 220 and to lift the bottom of the threaded shaft 242 away the base bar 210. Lifting the bottom of the threaded shaft 242 away from the base bar 210 may allow the pivot bar 220 to pivot towards the base bar 210 thus pivoting the door lift shoulder 222 downwards.

In some embodiments, the threaded shaft 242 may comprise an insertion limiter 244 to limit the insert distance of the threaded shaft 242 into the handle aperture 224 of the pivot bar 220.

The pivoting hand grip 260 may be located on the side of the extendable handle 240 at the top of the extendable handle 240. The pivoting hand grip 260 may be adapted to aid the user in turning the extendable handle 240 by providing leverage. The pivoting hand grip 260 may pivot between a grip lowered position and a grip raised position 290. The pivoting hand grip 260 may be operable as a lever for rotating the extendable handle 240 while the pivoting hand grip 260 is in the grip raised position 290.

In some embodiments, the extendable handle 240 may comprise a hanging loop 262 located on the top of the extendable handle 240. The hanging loop 262 may be operable to store the invention 100 by suspending the invention 100 from a hook.

In some embodiments, the threaded shaft 242 of the extendable handle 240 may be unscrewed from the handle aperture 224 such that the extendable handle 240 separates from the elevator door lockout 200. The elevator door lockout 200 and the extendable handle 240 may then be stored separately for more flexible storage options.

In use, the base bar 210 may be placed into a sill groove such that the door lift shoulder 222 of the pivot bar 220 is positioned under a bottom corner of a hoistway door 910. The threaded shaft 242 located at the bottom of the extendable handle 240 may be threaded into the handle aperture 224 of the pivot bar 220. The pivoting hand grip 260 located at the top of the extendable handle 240 may be pivoted to the grip raised position 290 and used as a lever to rotate the extendable handle 240. The extendable handle 240, and therefore the threaded shaft 242, may be rotated in the first rotational direction 294 to engage the elevator door lockout 200 by pivoting the pivot bar 220 upwards such that the door lift shoulder 222 presses against the bottom of the hoistway door 910. With the elevator door lockout 200 wedged between the sill groove 920 and the hoistway door 910, the hoistway door 910 may be immobilized. The extendable handle 240, and therefore the threaded shaft 242, May be rotated in the second rotational direction 296 to disengage the elevator door lockout 200 by pivoting the pivot bar 220 downwards such that the door lift shoulder 222 moves away from the bottom of the hoistway door 910. The invention 100 may be removed from the sill groove 920, thus permitting the hoistway door 910 to be moved.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

As used herein, "complement" or "complementary" may refer to a compatibility between threaded parts such that the gender, handedness, form, angle, pitch, diameter, and thread depth of both threads are compatible for the parts to mate by screwing the threads together. "Complement" and "complementary" may also be used to describe compatibility between geared parts and/or combinations of geared parts and threaded parts. As a non-limiting example, the worm screw and worm gear of a worm drive mechanism may be said to be complementary if the worm screw meshes with the worm gear and the worm screw is operable to turn the worm gear when the worm screw rotates.

As used herein, the words "couple", "couples", "coupled" or "coupling", may refer to connecting, either directly or indirectly, and does not necessarily imply a mechanical connection.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hinge" may be a device that permits the turning, rotating, or pivoting of a first object relative to a second object.

As used here, the word "midpoint" may refer to a point that is between the ends of an object. An "exact midpoint" may refer to a midpoint that is equidistant from edges of the object in at least one direction. Unless otherwise stated, a midpoint is not required to be at the exact center of the object but instead May be separated from the exact midpoint by up to 50% of the distance from the exact midpoint to the farthest edge, farthest end, or farthest corner.

As used in this disclosure, a "notch" may be an indentation formed in an edge or a cavity or aperture formed within a surface.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used in this disclosure, "telescopic", "telescoping", and "telescopically" may refer to an object made of two or more sections that fit or slide into each other such that the object can be made longer or shorter by adjusting the relative positions of the sections.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An elevator door lockout with extendable handle, the elevator door lockout comprising:
- an elevator door lockout and an extendable handle;
- wherein the elevator door lockout with extendable handle is operable to prevent movement of a hoistway door of an elevator by wedging the elevator door lockout between a sill groove and the hoistway door;
- wherein the extendable handle is adapted to turn a threaded shaft by grasping and turning the top of the extendable handle without requiring a user to bend down;
- wherein the elevator door lockout comprises a base bar and a pivot bar;
- wherein the base bar is configured to fit into the sill groove of the elevator;
- wherein the elevator door lockout is engaged by turning a threaded shaft of the extendable handle in a first rotational direction;
- wherein the elevator door lockout is disengaged by turning the threaded shaft in a second rotational direction;
- wherein the base bar width as measured from front to rear is less than the width of the sill groove as measured from front to rear.

2. The elevator door lockout with extendable handle according to claim 1
- wherein the pivot bar is located above the base bar;
- wherein the base bar and the pivot bar are pivotably coupled via a hinge pin.

3. The elevator door lockout with extendable handle according to claim 2
- wherein the pivot bar comprises a door lift shoulder;
- wherein the door lift shoulder is a downward-oriented notch located at the end of the pivot bar that is opposite the hinge pin;
- wherein the elevator door lockout is positioned such that the door lift shoulder is located beneath the hoistway door.

4. The elevator door lockout with extendable handle according to claim 3
- wherein the pivot bar pivots at the hinge pin in order to press the door lift shoulder up against the bottom of the hoistway door.

5. The elevator door lockout with extendable handle according to claim 4
- wherein the pivot bar comprises a handle aperture;
- wherein the handle aperture is a vertically-oriented threaded aperture located at a midpoint of the pivot bar.

6. The elevator door lockout with extendable handle according to claim 5
- wherein the threaded shaft passes through the handle aperture;
- wherein the threaded shaft comprises a thread that is complementary to the threading of the handle aperture such that the threaded shaft screws into the handle aperture.

7. The elevator door lockout with extendable handle according to claim 6
- wherein the extendable handle comprises a plurality of telescoping sections, the threaded shaft, and a pivoting hand grip;
- wherein the extendable handle is adapted for the user to rotate from a standing position in order to engage and disengage the elevator door lockout by pivoting the pivot bar.

8. The elevator door lockout with extendable handle according to claim 7
- wherein the plurality of telescoping sections are operable to lengthen and shorten the extendable handle to change the height of the pivoting hand grip;
- wherein two adjacent sections of the plurality of telescoping sections are different diameters such that a lower section slides into and out of an upper section;

wherein the extendable handle is lengthened to a handle extended configuration by sliding the lower section out of the upper section;

wherein the extendable handle is shortened to a handle retracted configuration by sliding the lower section into the upper section.

9. The elevator door lockout with extendable handle according to claim 8 wherein the threaded shaft is coupled to the bottom of the extendable handle.

10. The elevator door lockout with extendable handle according to claim 9 wherein the threaded shaft is turned in the first rotational direction to screw the threaded shaft into the pivot bar and to press the bottom of the threaded shaft against the base bar;

wherein pressing the bottom of the threaded shaft against the base bar pushes the pivot bar away from the base bar thus pivoting the door lift shoulder upwards.

11. The elevator door lockout with extendable handle according to claim 10 wherein the threaded shaft is turned in the second rotational direction to unscrew the threaded shaft from the pivot bar and to lift the bottom of the threaded shaft away the base bar;

wherein lifting the bottom of the threaded shaft away from the base bar allows the pivot bar to pivot towards the base bar thus pivoting the door lift shoulder downwards.

12. The elevator door lockout with extendable handle according to claim 11 wherein the threaded shaft comprises an insertion limiter to limit the insert distance of the threaded shaft into the handle aperture of the pivot bar.

13. The elevator door lockout with extendable handle according to claim 12 wherein the pivoting hand grip is located on the side of the extendable handle at the top of the extendable handle;

wherein the pivoting hand grip is adapted to aid the user in turning the extendable handle by providing leverage.

14. The elevator door lockout with extendable handle according to claim 13 wherein the pivoting hand grip pivots between a grip lowered position and a grip raised position.

15. The elevator door lockout with extendable handle according to claim 14 wherein the pivoting hand grip is operable as a lever for rotating the extendable handle while the pivoting hand grip is in the grip raised position.

16. The elevator door lockout with extendable handle according to claim 15 wherein the extendable handle comprises a hanging loop located on the top of the extendable handle;

wherein the hanging loop is operable to store the elevator door lockout with extendable handle by suspending the elevator door lockout with extendable handle from a hook.

17. The elevator door lockout with extendable handle according to claim 16 wherein the threaded shaft of the extendable handle is unscrewed from the handle aperture such that the extendable handle separates from the elevator door lockout.

* * * * *